Figure 1:
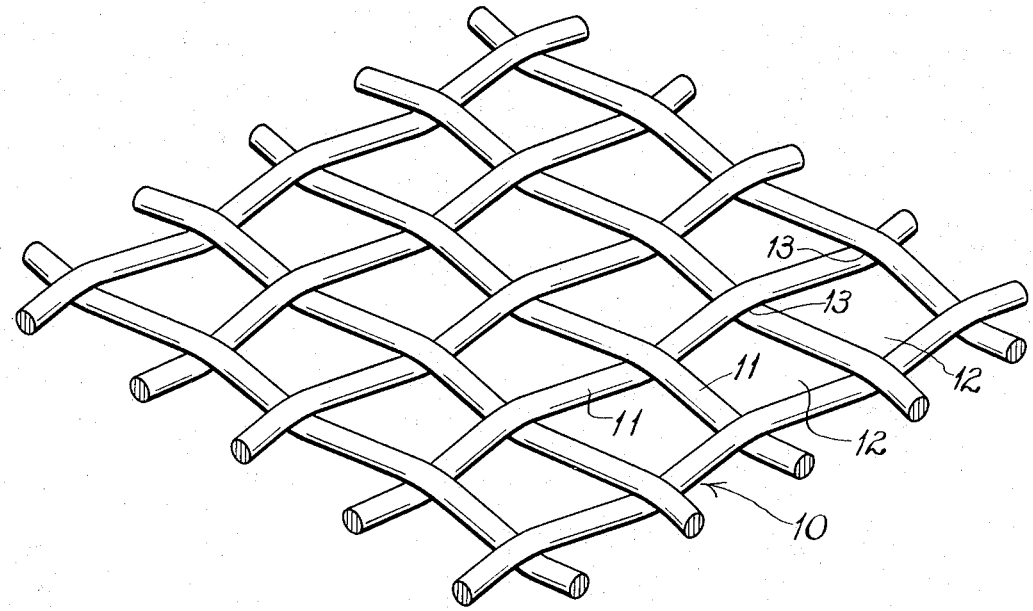

March 22, 1966 R. C. BERGH 3,241,227
METHOD OF STRUCTURALLY REINFORCING METALLIC MESH SCREENS
Filed Dec. 3, 1962 2 Sheets-Sheet 1

INVENTOR.
ROLAND C. BERGH
BY
ATTORNEY

** 3,241,227
METHOD OF STRUCTURALLY REINFORCING
METALLIC MESH SCREENS**
Roland C. Bergh, Cedarhurst, N.Y., assignor, by mesne assignments, to Fairchild Hiller Corporation, Hagerstown, Md., a corporation of Delaware
Filed Dec. 3, 1962, Ser. No. 241,797
3 Claims. (Cl. 29—471.1)

This invention relates to the fabrication of mesh screens and more particularly to a method of structurally reinforcing metallic mesh screens to maintain their designed configuration and interstitial areas.

In many applications mesh screens are exposed or subjected to forces and pressures that can and have distorted them whereby some or all of their interstices become enlarged rendering them ineffective for their intended purpose. At the same time it is desirable that the screen retain limited flexibility lest the filaments or wires of which it is formed break under the imposed load.

Moreover, it is often essential that the interstitial areas of the screen remain substantially unobstructed so as to preserve the designed air flow therethrough. By way of example, protective wire mesh screens are installed at the inlets to air ducts for jet engines of aircraft to prevent the entry of debris thereto. These inlet ducts are critically designed to accommodate specific quantities of air which must match all operations of the associated engine for maximum efficiency thereof. The loads imposed on these screens by air pressure during flight of the aircraft, as well as by random objects that may strike, are substantial and have resulted in damaging effects.

In order to overcome the foregoing shortcomings, the present invention contemplates a method of reinforcing wire mesh screens whereby they are capable of withstanding loads of a magnitude heretofore totally destructive. The method is such that the ultimate reinforced screen produced thereby retains substantially all of its initial flexibility and permits a design to specific configuration having preselected accurately defined interstitial areas.

In addition, in the air inlet duct application referred to above, wire mesh screens produced in accordance with the teachings of this invention appreciably improve the airflow, particularly high speed airflow, i.e., airflow having sonic, supersonic and hypersonic velocities, through the duct as compared to screens presently employed. In existing screens crevices are formed at each junction of the intersecting wires which, under high speed conditions create eddies within the airstream, the aggregate of which produces an objectionable turbulence.

The method herein proposed consists in so joining or interconnecting the several intersecting wires of the screen that a substantially integral structure results. This joining of the wires is effected in such a way as not to reduce the inherent resiliency thereof nor extend to any consequential degree beyond the dimensions of the individual wires themselves so as to result in interstitial areas other than those designed. Moreover, the several intersections of the wires of the screen are aerodynamically contoured or faired to establish a smooth and relatively uninterrupted airflow through the screen.

Figure 2:
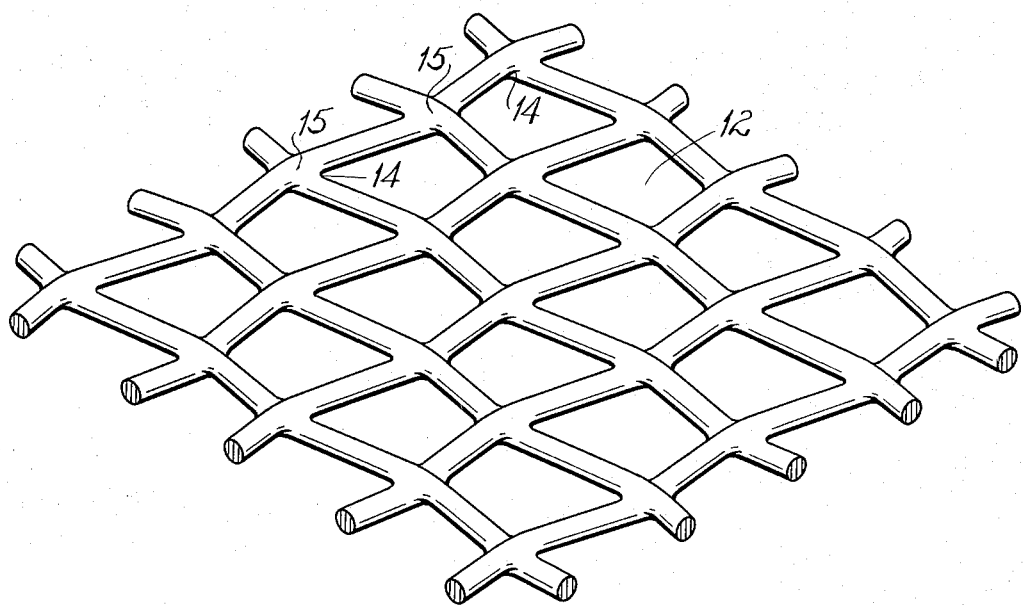
Figure 3:
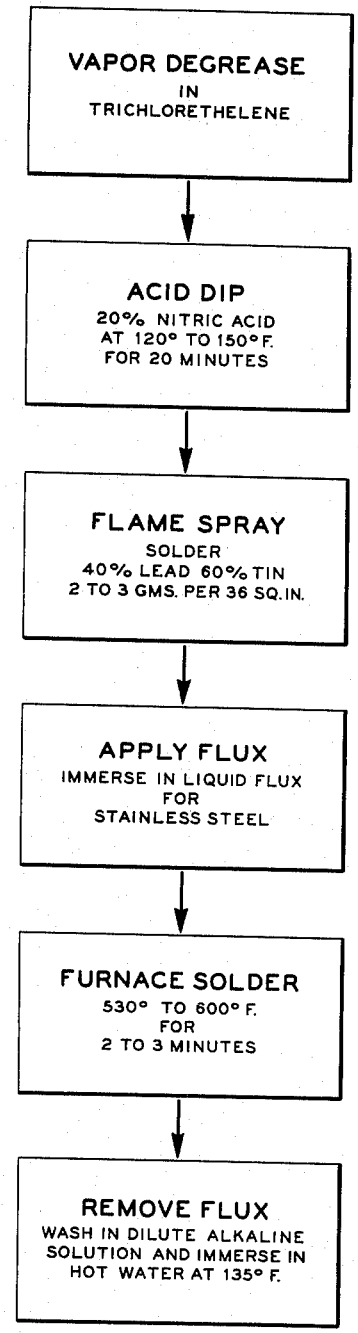

With the above and other objects in view as will be apparent this invention consists in the construction, combination, arrangement and sequence of steps all as hereinafter more fully described, claimed and illustrated in the accompanying drawings, wherein:

FIG. 1 is a perspective view of a fragment of wire mesh screen illustrative of conventional fabrication;

FIG. 2 is a similar view of the screen of FIG. 1 after it has been structurally reinforced following the teachings of the instant invention; and FIG. 3 is a diagram of the sequence of operations proposed herein to produce the structurally reinforced screen shown in FIG. 2 which for purposes of illustration and a clearer understanding of the invention is specific to screens fabricated of stainless steel.

Referring now specifically to the drawings, 10 designates a fragment of wire mesh screen of conventional fabrication, the individual wires 11 of which pass successive intersecting wires 11 alternately on opposite sides and define the screen openings or interstitial areas 12. Thus, at each intersection the wires are disposed in a different plane creating crevices or corners 13 defined by the contacting surfaces of the wires. 11.

Initially the screen 10 is cleaned to remove all traces of dirt, grease, etc. Preferably in this cleaning operation the screen is first vapor degreased. Whether or not vapor degreased the screen 10 is washed in either an acid or alkaline solution depending upon the particular material of its fabrication. This washing produces a thoroughly cleaned screen including the removal of oxides from all exterior surfaces thereof.

In its cleaned condition the screen is then coated with a relatively thin film of compatible metal, ie., one that will adhere to the metal of the screen and also has a melting point below the critical temperature of the wire screen so as not to adversely affect its properties, such as grain structure, ductility, etc. Preferably this film is applied by spraying it in a liquid or vapor form on the screen at room temperature whereby it solidifies quickly and a relatively uniform film thickness of about 2 or 3 grams per 36 inches of screen can be obtained. By so spraying it has been found that the metal film need be applied to only one side of the screen and it later flows to the unsprayed side during the subsequent heating operatioin.

Where the heating operation is to be performed in a non-inert atmosphere, as preferred herein, a flux is applied to the screen in order to protect the metal film from oxidizing. The flux also assists in the flow of the metal film when melted during the heating operation. Several fluxes are available on the open commercial market sold under specific trade names such as, for example, All State #430, which is a non-acid liquid flux or Dunton's Liquid Flux, which is essentially an acid. The selection of the proper flux will be determined by the particular metal employed in the film metal coating.

The flux may be applied by spraying; it has been determined that it is sufficient to spray only the metal-sprayed side of the screen. The preferred method, however, is to immerse the screen in the liquid flux since there is less likelihood of missing areas thereof. In either case, excess flux is permitted to drain off.

After the metal film has been applied the heating operation is started. Where a flux has been employed this heating operation should follow immediately and the initial rise in temperature causes the metal film on the screen to be sweated providing an active flux during the continued heating and bonding or joining operation. The heating operation is accomplished by subjecting the screen 10 with or without flux to an elevated temperature above the melting range of the metal film but below the critical temperature of screen wire. As the solder is thereby caused to melt it flows due to capillary forces into the several crevices 13 forming fillets 14 thereon that are confined to substantially the same dimensions as the transverse dimensions of the wires 11, and therefore, maintain the interstitial areas 12 of the screen substantially unobstructed.

Upon completion of the heating cycle as stated the temperature is reduced to a stable temperature of the film metal first causing it to solidify or set. The several wires that constitute the screen are thereby integrally joined or interconnected, as at 15, to produce an appreciably strengthened structure. The metal film having greater ductility than the wire of the screen, the necessary flexibility of the ultimate screen is obtained. Hence, the ultimate screen will not be brittle, particularly at the joints 15 where the greatest stresses are imposed and which tend to break upon the application of the expected loads.

Thereafter the screens are subjected to a stable temperature of the metal film and may be given a final cleaning. Where a flux has been employed cleaning is necessary in order to remove all traces of the external or surface flux. This is preferably done by immediately washing, for example, by immersing the screen in hot water.

In order to facilitate a complete understanding of the invention reference is made to FIG. 3 where a specific application of the method proposed herein is shown. In this particular case, the screen 10 employed was fabricated of stainless steel. Initially, the screen was vapor degreased in trichlorethylene and then immersed in a solution containing approximately 20% by weight nitric acid at a temperature of about 120° to 150° F. for approximately twenty minutes. Thereafter, the screen was flame-sprayed with a thin film of solder comprising an alloy of about 60% tin and 40% lead both by weight to a thickness of 2 to 3 grams per 36 square inches.

Flux was applied to the screen thus coated by immersing it in Dunton's Liquid Flux which it had previously been determined to be particularly suitable for screens of stainless steel. Heating was affected by furnace solder, i.e., the screen was placed in an oven and subjected to a temperature of 530° to 600° F. for 2 to 3 minutes. A fixture or jig was employed to hold the screen and thereby prevent contact thereof with the walls and floor of the oven. Thus the entire screen was held within the melting temperature range of the metal film and a uniform flow thereof occurred as the solder melted. Due to its relatively good adhesive properties with stainless steel the solder flowed by capillary action into the several crevices 13. The oven was then turned off reducing the temperature to a stable one for the solder causing it to solidify and thus effect the union of all intersections of the wires in the screen.

Thereafter the screen was removed from the oven and washed in a dilute alkaline solution followed by immersing it in hot water at 135° F. As an additional measure to insure complete removal of surface flux or scales, the screen was brushed while thus immersed.

What is claimed is:

1. The method of structurally reinforcing a metallic mesh screen comprising the steps of cleaning the screen, coating one side of the screen with a thin film of metal having a melting point below the critical temperature of the metal of the screen, subjecting the screen to an elevated temperature above the melting point of said metal film, and subjecting the screen to the stable temperature of the metal film.

2. The method of claim 1 including the additional steps of applying flux to the screen after said coating and prior to subjecting it to said elevated temperature, and removing the surface flux from the screen after it has been subjected to said stable temperature.

3. The method of structurally reinforcing a metallic mesh screen consisting of a plurality of intersecting metal wires, said method comprising the steps of cleaning said screen, applying to one side of said screen a thin film of metal having a melting point less than the critical temperature of the metal wires of said screen, subjecting said screen and the thin metal film applied thereto to a temperature above the melting point of the metal of said film whereby the metal of said film flows between the intersections of the metal wires of said screen, and subjecting said screen to a stable temperature for the metal of said film to solidify the same.

References Cited by the Examiner

UNITED STATES PATENTS

| | | | |
|---|---|---|---|
| 1,555,296 | 9/1925 | Kirschner | 29—502 X |
| 2,049,575 | 8/1936 | Sutton. | |
| 2,232,176 | 2/1941 | Guthrie | 29—502 X |
| 2,262,072 | 11/1941 | Vaughn. | |
| 2,414,923 | 1/1947 | Batcheller. | |
| 2,445,431 | 7/1948 | Hill. | |

OTHER REFERENCES

Notes on Soldering by Lewis: issued March 1948 by Tin Research Institute, Fraser Road, Greenford, Middlesex, England, pages 10, 12, 52 and 63.

JOHN F. CAMPBELL, *Primary Examiner.*